United States Patent [19]
Dobbs et al.

[11] Patent Number: 5,429,328
[45] Date of Patent: Jul. 4, 1995

[54] SPACECRAFT PAYLOAD EXCHANGE SYSTEM

[75] Inventors: Michael E. Dobbs, Brighton; Donald B. Jones, Ann Arbor, both of Mich.

[73] Assignee: Environmental Research Institute of Michigan, Ann Arbor, Mich.

[21] Appl. No.: 977,075

[22] Filed: Nov. 16, 1992

[51] Int. Cl.⁶ .............................................. B64G 1/64
[52] U.S. Cl. ................................. 244/159; 244/161
[58] Field of Search .................. 244/158 R, 161, 159; 414/345; 901/17, 23, 25

[56] References Cited

U.S. PATENT DOCUMENTS

| | | | |
|---|---|---|---|
| 4,079,904 | 3/1978 | Groskopfs et al. | 244/158 R |
| 4,273,305 | 6/1981 | Hinds | 244/158 R |
| 4,298,178 | 11/1981 | Hujsak | 244/158 R |
| 4,349,837 | 9/1982 | Hinds | 244/161 |
| 4,898,348 | 2/1990 | Kahn | 244/161 |
| 4,903,919 | 2/1990 | Johnson et al. | 244/161 |
| 4,964,596 | 11/1990 | Ganssle et al. | 244/158 R |

FOREIGN PATENT DOCUMENTS 2091194 7/1982 United Kingdom .

OTHER PUBLICATIONS

F. C. Runge, Space Tug/Spacecraft/Module Exchanger, 1977, vol. 12, No. 5, pp. 451–462.

Primary Examiner—William Grant
Attorney, Agent, or Firm—Gifford, Krass

[57] ABSTRACT

A method of manufacturing in space and a spacecraft assembly to accomplish such manufacture. The spacecraft assembly includes a spacecraft including a plurality of canister compartments circumferentially spaced about the central axis of the spacecraft and opening in a docking face of the spacecraft, a plurality of canisters respectively positioned in the compartments, and a passive docking mechanism proximate the docking face and proximate the central axis, and a service vehicle comprising a plurality of canister compartments spaced circumferentially about the central axis of the service vehicle, a plurality of canisters respectively positioned in the compartments, and a manipulator assembly including an active docking structure, including a boom extending forwardly from the docking face, and a canister handling assembly mounted on the boom. In one embodiment, the spacecraft remains permanently in orbit, a manufacturing process is performed on the spacecraft to produce an end product which is housed in the canisters, and the service vehicle periodically visits the orbiting spacecraft to perform a canister exchange with the spacecraft, utilizing the canister exchange with the spacecraft, utilizing the canister handling assembly, and replenishing the spacecraft supplies.

4 Claims, 8 Drawing Sheets

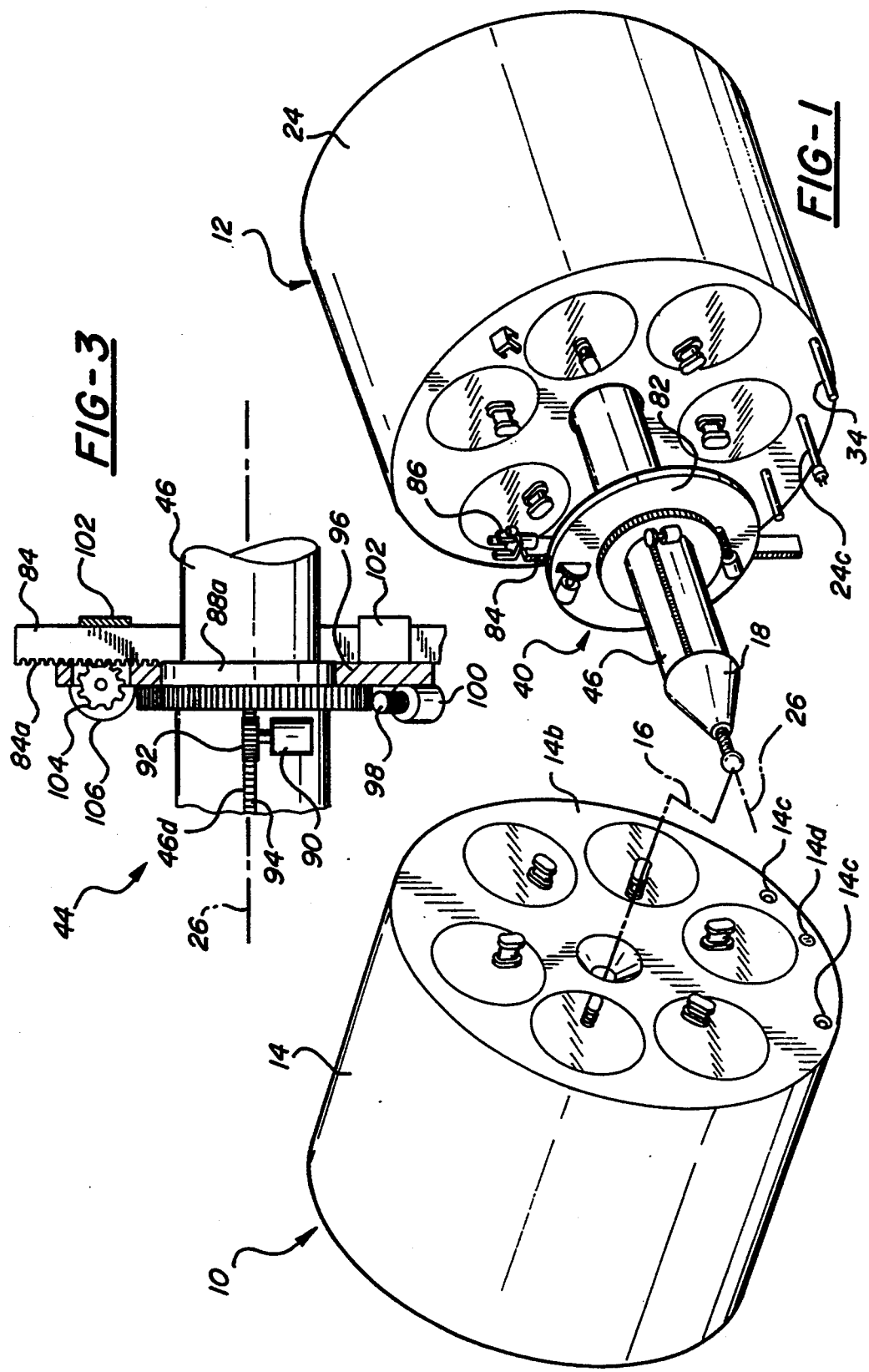

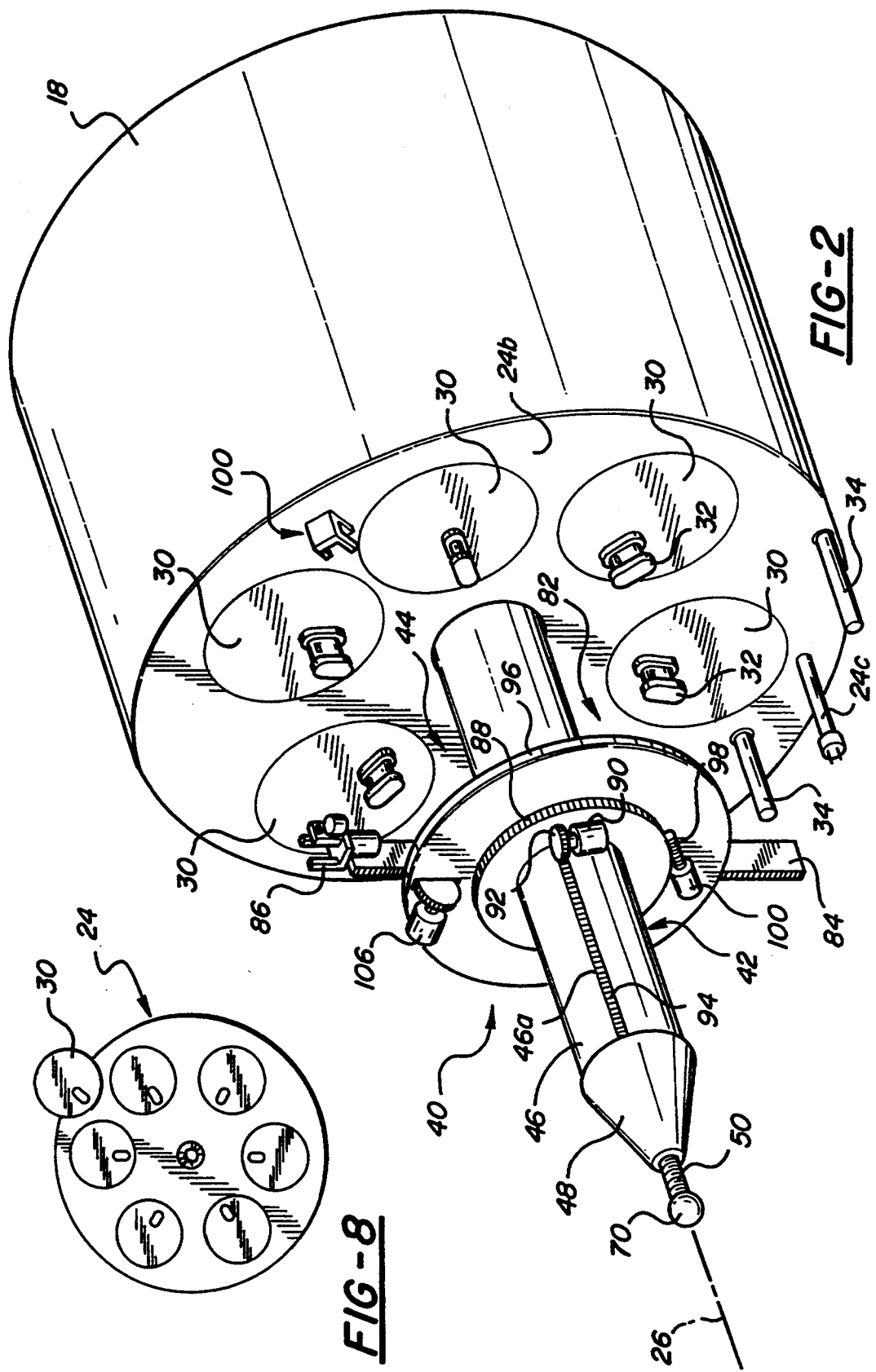

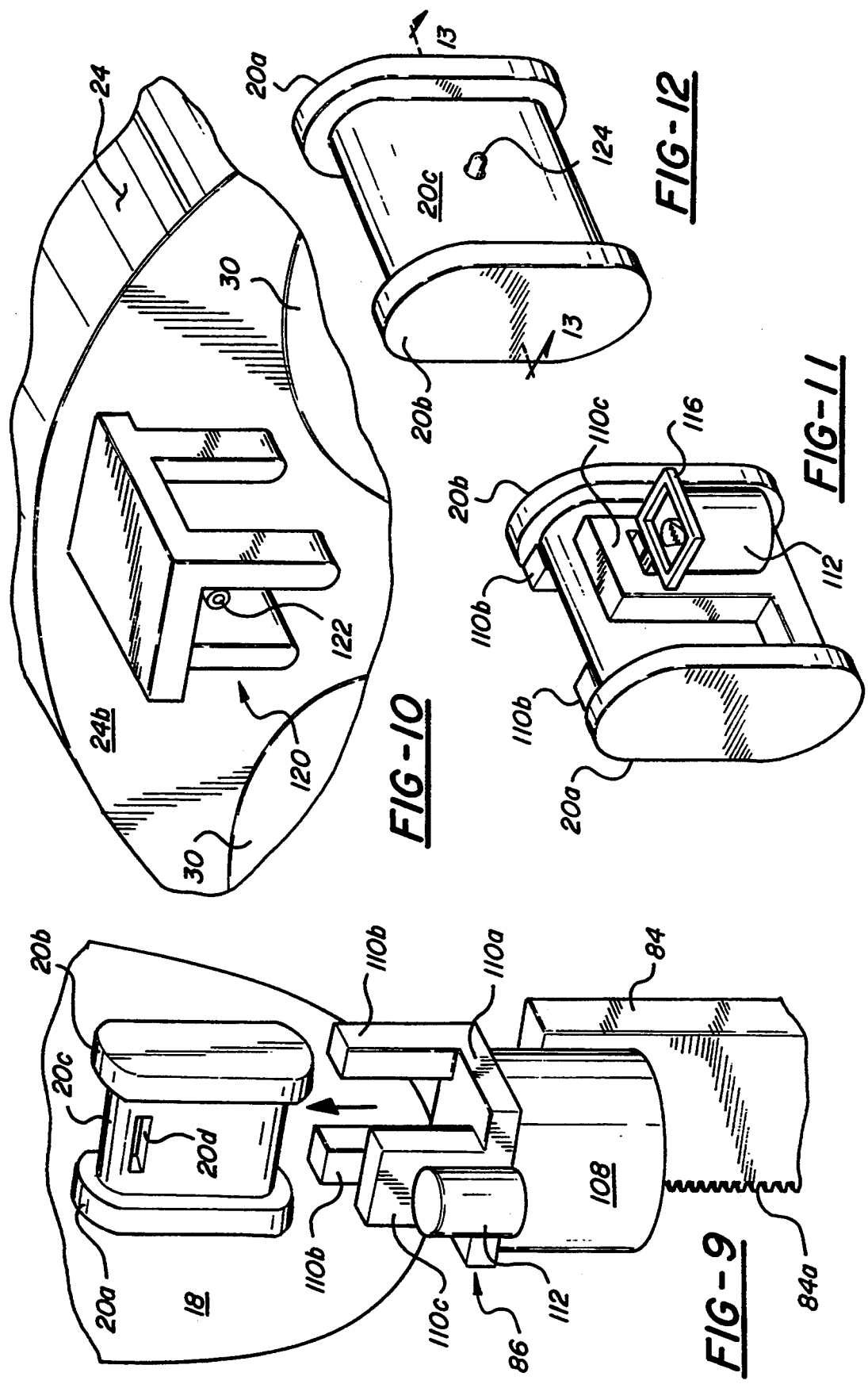

5,429,328

SPACECRAFT PAYLOAD EXCHANGE SYSTEM

The invention of this application was supported in part by Grant No. NAGW-1198 awarded by the National Aeronautics and Space Administration. The United States government has certain rights in this application.

FIELD OF THE INVENTION

This invention relates to spacecraft assemblies and more specifically to spacecraft payload exchange systems.

There is interest in commercial uses of outer space and particularly earth orbit. This environment offers unique characteristics such a zero gravity and unlimited vacuum that may be very useful to certain high value added manufacturing processes. The major problem with exploiting these features of the earth orbit environment is the extremely high cost associated with launch and recovery of payloads. One possible solution to the problems of launch and recovery involves a semi-permanent orbiting vehicle that is periodically serviced for refueling, resupply, and exchange of processed payloads for new, unprocessed payloads. The most economical manner of doing these operations involves unmanned, unsupervised, autonomous rendezvous and docking vehicles. It is important therefore to develop an autonomous system for docking and payload exchange that is simple, reliable and relatively inexpensive.

SUMMARY OF THE INVENTION

The invention relates to methods of manufacturing in space utilizing exchangeable payloads and canisters and to apparatus to facilitate a reliable and economical exchange of the payloads.

According to the method of manufacturing in space, an original manufacturing canister is positioned on a spacecraft., the spacecraft is placed in orbit, a manufacturing process is performed onboard the spacecraft while the spacecraft moves in its orbit to produce a manufactured product within the canister, a replacement manufacturing canister having a size and configuration corresponding generally to the size and configuration of the original canister is positioned on a service vehicle, the service vehicle is placed in the orbit of the spacecraft, the service vehicle is docked to the orbiting spacecraft, the original canister is transferred from the orbiting spacecraft to the service vehicle, the replacement canister is positioned on the orbiting spacecraft in the position vacated by the original canister, the service vehicle and spacecraft are undocked, and the service vehicle is returned to earth to harvest the product produced within the canister. This basic methodology provides a simple and relatively inexpensive method for carrying out manufacture in space.

According to a further feature of the invention methodology, the spacecraft has a plurality of compartments respectively housing a plurality of original canisters and the service vehicle has a plurality of compartments respectively housing a plurality of replacement canisters, each of the original canisters is removed from its respective compartment on the spacecraft, each of the replacement canisters is removed from its respective compartment on the service vehicle, an original canister is positioned in each of the vacated compartments on the service vehicle, and a replacement canister is positioned in each of the vacated compartments on the spacecraft. Utilization of a plurality of compartments and canisters significantly reduces the cost of the manufacturing process.

According to a further feature of the invention methodology, the service vehicle includes a manipulator assembly including a central docking boom and a canister handling assembly mounted for axial movement along the boom. The method comprises docking the boom with the spacecraft with the boom in an extended position to establish a first, spaced docking position; actuating the canister handling assembly to transfer the original canister from the spacecraft to the service vehicle; and retracting the boom to move the spacecraft and service vehicle to a second closely coupled docking position for the transfer of replenishment fluids. This methodology allows the canister exchange to take place with the spacecraft expeditiously coupled but spaced and facilitates the supply of manufacturing process consumables and fluids to the orbiting spacecraft by providing a second closely coupled docking position.

According to a further feature of the invention methodology, each of the canister compartments in the spacecraft open in a docking face of the spacecraft and each of the canister compartments on the service vehicle open in a docking face of the spacecraft and the method includes the step of docking the service vehicle and spacecraft in a position in which the docking faces are confronting but axially spaced by a distance at least as great as the length of the canister; moving a replacement canister axially forwardly out of a service vehicle compartment until it reaches a position between the confronting docking faces; moving the replacement canister radially outwardly to a position radially beyond the spacecraft and the service vehicle; rotating the replacement canister through 180°; moving the replacement canister axially rearwardly to again position it axially between the confronting faces but radially outwardly of the spacecraft and service vehicle; moving the replacement canister radially inwardly to a position it axially between the confronting docking faces and in radial alignment with the compartments; and moving the replacement canister axially forwardly to position it in a vacated compartment on the spacecraft. This specific exchange methodology allows the canisters to be exchanged with the spacecraft in a coupled, relatively close disposition.

According to a further feature of the invention methodology, the service vehicle and spacecraft compartments are each arranged in circumferentially spaced relation about the central axis of the spacecraft and service vehicle respectively; the spacecraft and service vehicle are docked with their central axes generally aligned; and following the movement of the replacement canister radially inwardly to position it axially between the confronting docking faces and in radial alignment with the compartments, the replacement canister is rotated about the aligned central axes of the spacecraft and service vehicle to reach a circumferential position opposite a vacated spacecraft compartment. This methodology further facilitates the ready exchange of a plurality of replacement canisters with a plurality of original canisters.

According to a further feature of the invention methodology, prior to the transfer of a replacement canister to an empty compartment of the spacecraft, the empty spacecraft compartment is created by removal of an original canister from the spacecraft and parking of the removed original canister on the service vehicle. This parking arrangement allows a number of replacement canisters to be exchanged with an equal number of original canisters.

The invention also provides a manipulator assembly for use with a service space vehicle to facilitate docking of the service vehicle with an orbiting spacecraft and canister exchange between the docked spacecraft and service vehicle. The invention manipulator assembly comprises a central boom, a carriage mounted for axial and rotational movement on the boom, an arm mounted for radial movement on the carriage, and a gripper mounted on the radial outer end of the arm. This assembly allow for ready and convenient docking of the service vehicle with the spacecraft and ready and convenient canister exchange as between the docked spacecraft and service vehicle.

The invention also provides a service vehicle adapted to dock with an orbiting spacecraft to facilitate canister exchange between the spacecraft and the service vehicle. The service vehicle includes a main body structure including a docking face, a boom extending centrally from the docking face, a carriage mounted for axial and rotational movement on the boom, an arm mounted for radial movement on the carriage, and a gripper mounted on the radial outer end of the arm. The invention service vehicle readily docks with an orbiting spacecraft and performs an expeditious canister exchange as between the spacecraft and the service vehicle.

According to a further feature of the invention, the service vehicle further includes means operative to retract the boom relative to the docking face of the service vehicle. This arrangement allows the service vehicle to dock in a spaced position relative to the orbiting spacecraft to facilitate canister exchange and further allows the service vehicle to dock in a closely coupled position relative to the orbiting spacecraft to facilitate supply of the spacecraft witch manufacturing process consumables and replenishing fluids.

The invention further comprises a spacecraft assembly including a spacecraft including a main body structure having a central axis, a plurality of canister compartments circumferentially spaced about the central axis and opening in a docking face of the main body structure, a plurality of canisters respectively positioned in the compartments, and passive docking means proximate the docking face and proximate the central axis, and a service vehicle comprising a main body structure having a central axis, a plurality of canister compartments spaced circumferentially about the central axis, a plurality of canisters respectively positioned in the compartments, and a manipulator assembly including an active docking structure, including a boom extending forwardly from said docking face, and a canister handling assembly mounted on the boom. The invention spacecraft assembly allows the orbiting spacecraft to remain in orbit for extended periods of time while allowing the service vehicle to readily and periodically dock with the service vehicle to perform a canister exchange and a resupply.

According to a further feature of the invention, the canister handling assembly includes a carriage mounted for axial and rotational movement on the boom, an arm mounted for radial movement on the carriage, and a gripper mounted on the free end of the arm for movement about an axis generally normal to the boom axis. This canister handling assembly facilitates the ready exchange of canisters as between the spacecraft and the service vehicle.

In the disclosed embodiment of the invention, each of the canisters includes a lug, the gripper includes a latching mechanism operative to latchingly engage the lug in response to relative radial movement between the gripper and the lug, and the gripper includes a motor operative in response to energization of the motor to disengage the gripper from the lug. This arrangement allows ready gripping and release of the canisters to facilitate their transfer between the spacecraft and the service vehicle.

BRIEF DESCRIPTION OF THE DRAWINGS

FIG. 1 is a perspective view of a spacecraft assembly according to the invention;

FIG. 2 is a perspective view of a service vehicle forming a part of the invention spacecraft assembly;

FIG. 3 is a fragmentary view of a manipulator assembly forming a part of the service vehicle;

FIG. 8 is a schematic end view of the service vehicle; and

FIGS. 9–16 are views showing details of gripper and lug mechanisms employed in the invention spacecraft assembly.

DETAILED DESCRIPTION OF THE PREFERRED EMBODIMENT

Figure 4:
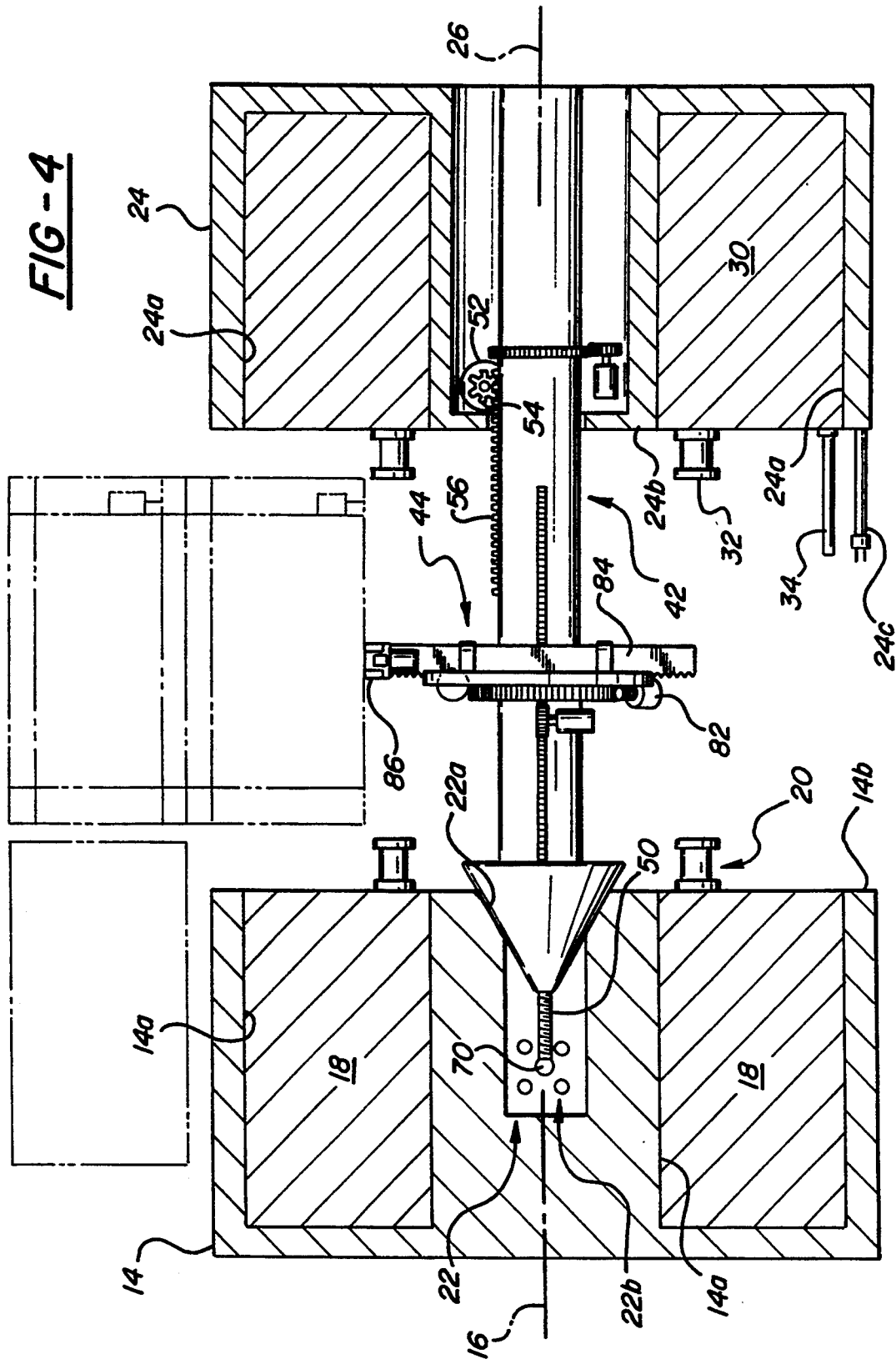
FIG. 4 is a schematic view of the invention spacecraft assembly illustrating the canister exchange procedure.
Figure 5:
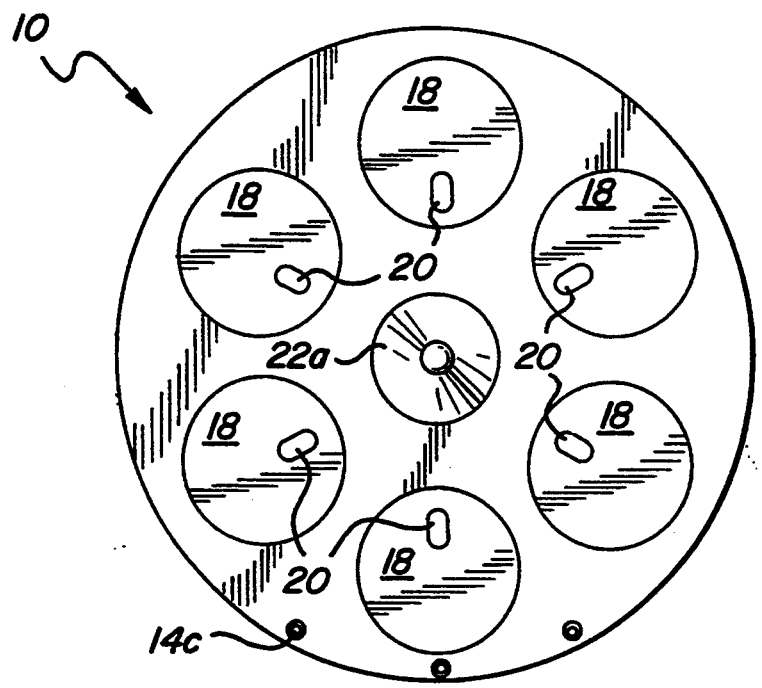
FIG. 5 is a front view of a spacecraft forming a part of the invention spacecraft assembly.
Figure 6:
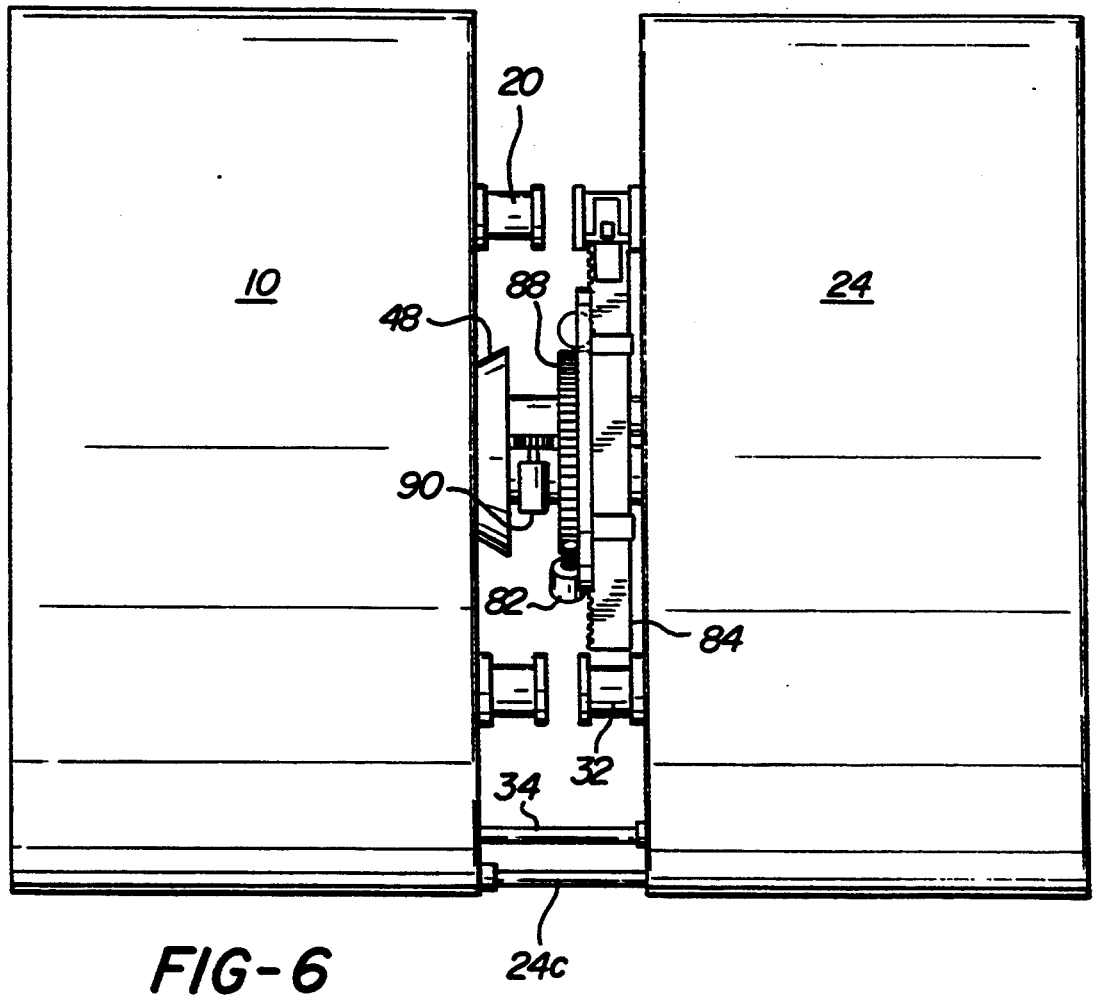
FIG. 6 is a view showing the spacecraft and service vehicle in closely coupled docking disposition.
Figure 7:
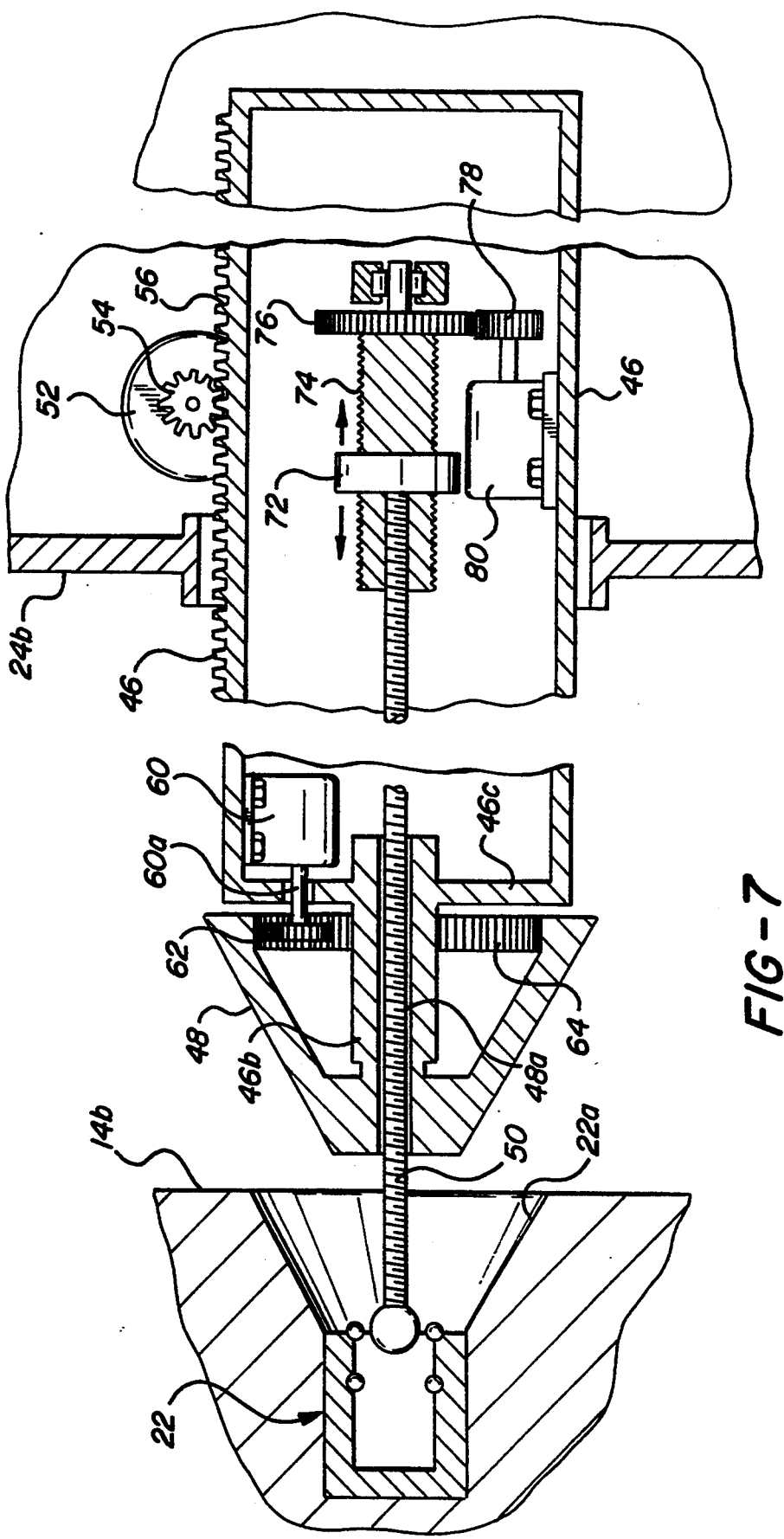
FIG. 7 is a fragmentary cross-sectional view of the docking mechanism employed in the invention spacecraft assembly.
Figure 16:
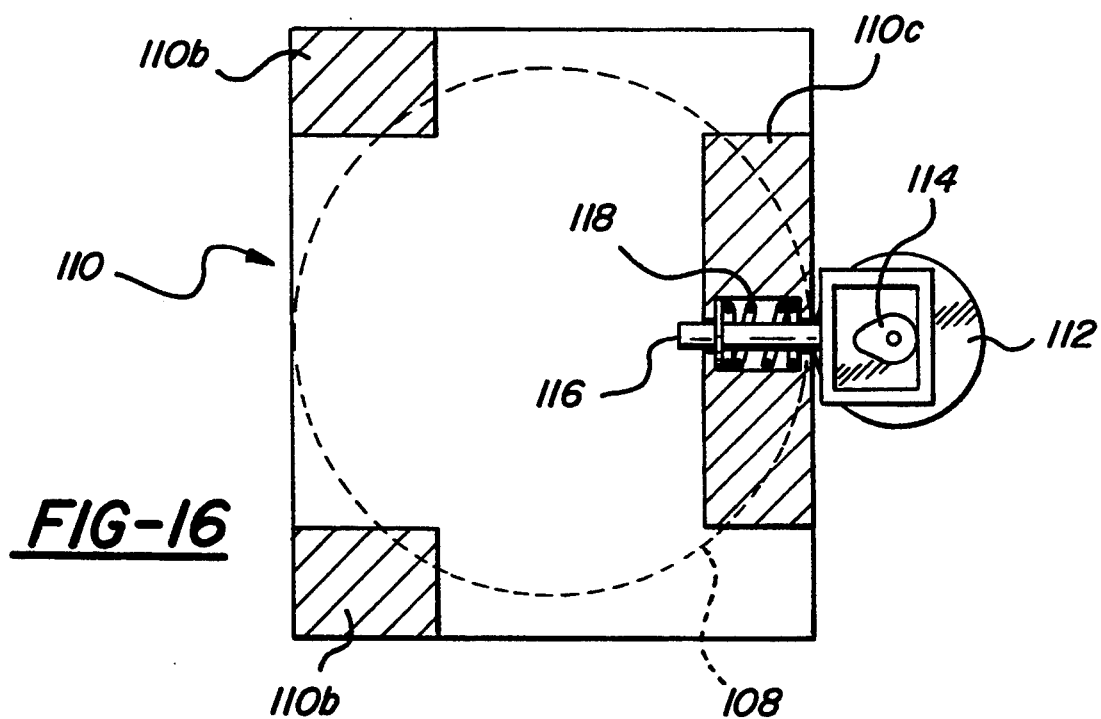
Figure 13:
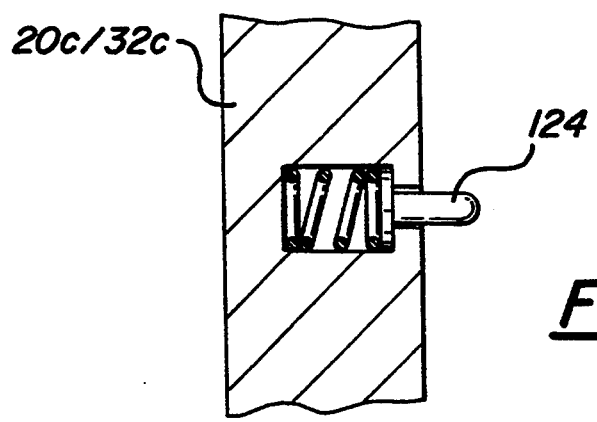
Figure 14:
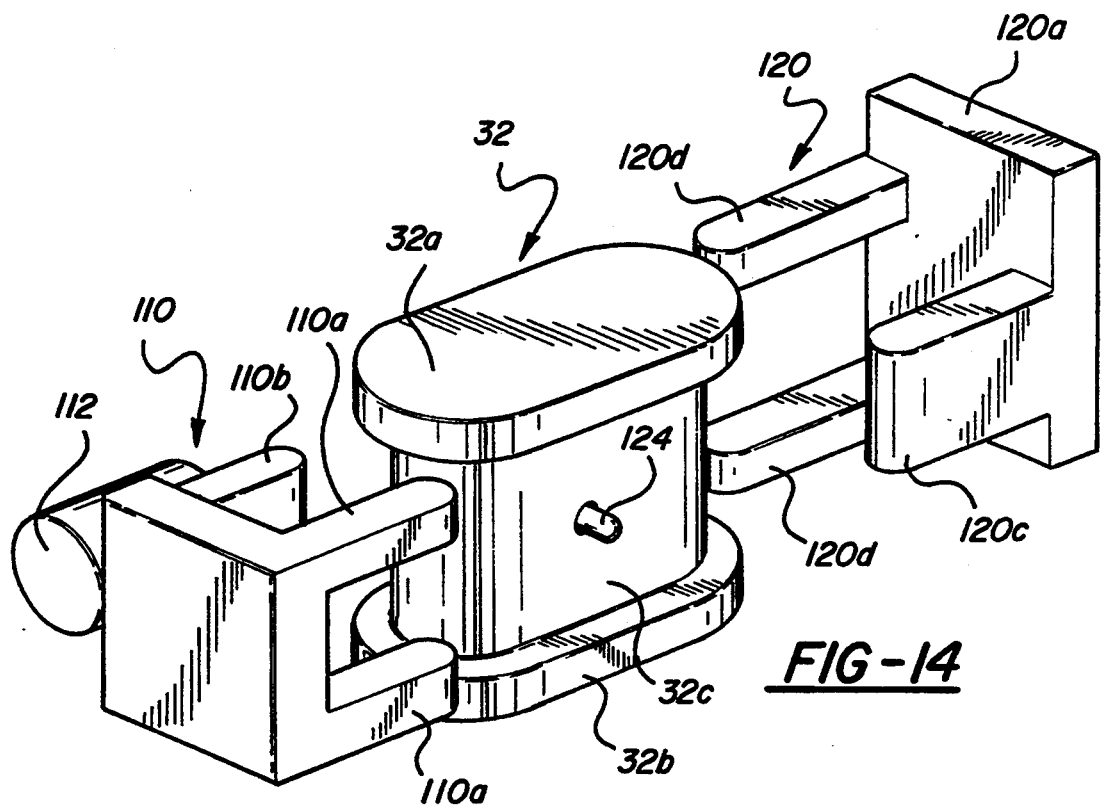
Figure 15:
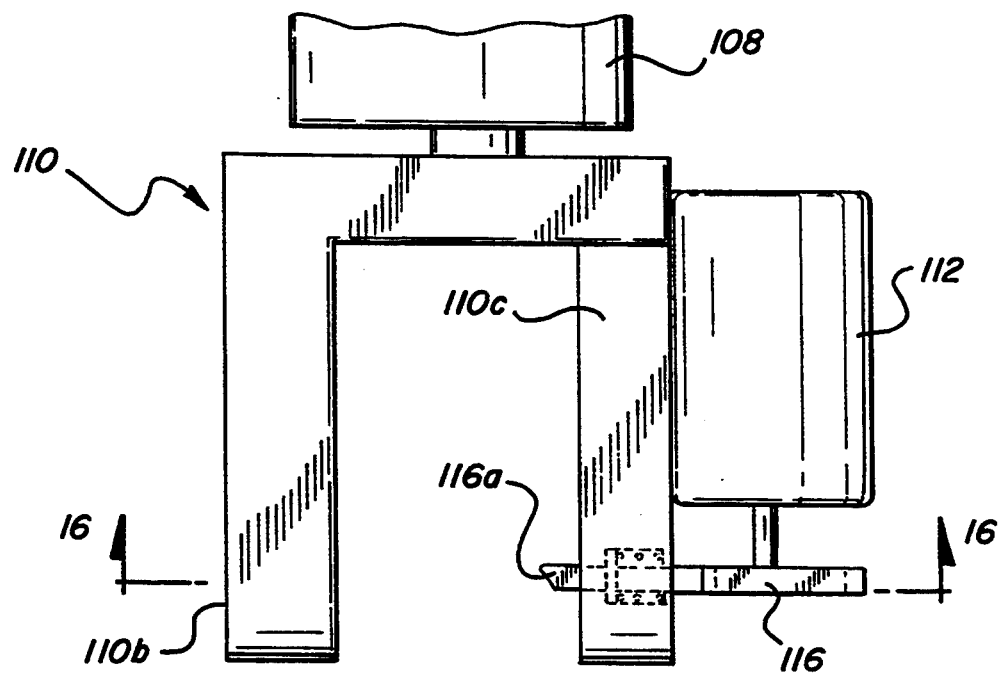

FIG. 1 illustrates an orbiting spacecraft 10 arranged to carry a plurality of canisters and a service vehicle 12 carrying a like plurality of canisters and arranged to dock with the orbiting spacecraft 10 to facilitate the interchange of canisters between the spacecraft 10 and the service vehicle 12.

Spacecraft 10 includes a main body structure 14 of generally cylindrical configuration and defining a plurality of cylindrical axially extending compartments 14a spaced circumferentially about the central axis 16 of the spacecraft and opening in a docking face 14b; a plurality of cylindrical canisters 18 sized to fit slidably in compartments 14a and each including a lug 20 to facilitate insertion of the canister into the compartment and removal of the canister from the compartment; a plurality of resupply sockets 14c opening in the docking face 14b of the main body structure; and a passive docking structure 22 positioned on axis 16 and opening in the docking face 14b. Docking structure 22 includes a conical socket 22a opening in the docking face 14b and a latching mechanism 22b. Latching mechanism 22b is only schematically shown but is shown and described in further detail in U.S. Pat. No. 5,364,046.

Service vehicle 12 has a size and configuration generally corresponding to the size and configuration of spacecraft 14 and includes a cylindrical main body structure 24 including a plurality of cylindrical axially extending compartments 24a spaced circumferentially about the central axis 26 of the service vehicle and opening in the docking face 24b of the service vehicle; a plurality of cylindrical replacement canisters 30 respectively slidably positioned in compartments 24a and each including a lug 32 adapted to be grasped to facilitate insertion of the canister into the respective compartment and removal of the canister from the respective compartment; a plurality of resupply probes 34 projecting forwardly from the docking face 24b of the service vehicle; and a manipulator assembly 40. Canisters 30 and compartments 24a correspond in size and configuration to canisters 18 and compartments 14a, respectively.

Manipulator assembly 40 includes an active docking structure 42 and a canister handling assembly 44.

Active docking structure 42 includes a cylindrical boom 46, a docking cone 48 and a docking cable 50.

Boom 46 is positioned on the central axis 26 of the service vehicle, extends forwardly from the docking face 24b of the service vehicle, and is arranged to move telescopically with respect to the service vehicle along axis 26 so as to selectively vary the extent to which the boom extends forwardly from the docking face 24b. Boom 46 may be extended and retracted relative to the docking face 24b for example by an electric motor 52 mounted on the main body structure of the service vehicle and driving a pinion gear 54 meshingly engaging a rack 56 provided on the boom 46. It will be understood that suitable guide and bearing means (not shown) will be provided to guide the axial movement of the boom.

Docking cone 48 has a configuration generally corresponding to the configuration of conical socket 22a in the docking face 14b of spacecraft 10 and is mounted for rotational movement on a hub 46b extending forwardly from the forward end wall 46c of the boom. Rotation of the docking cone 48 about axis 26 and relative to boom 46 is accomplished by an electric motor 60 mounted within the boom and including a drive shaft 60a extending through boom forward wall 46c and driving a pinion gear 62 engaging the teeth of a circumferential gear 64 provided on the internal periphery of cone 48.

Cable 50 passes through a hub portion 48a of docking cone 48 and includes a ball 70 at its forward end for docking coaction with latching mechanism 22. The rearward end of the cable is secured to a nut 72 threaded on a screw 74 secured to a drive gear 76. Drive gear 76 is driven by a pinion gear 78 driven by an electrical motor 80 mounted within boom 46. Energization of motor 80 results in axial movement of nut 72 forwardly and rearwardly along the screw 74 to extend and retract the cable 50 relative to docking cone 48. Cable 30 may be constructed for example of multi strand steel cable inside a strip of spring steel wrapped helically and tightly around the cable. The wrapped spring cable provides the requisite compressive strength and bending stiffness and may be similar to the type of cable used in drainage "snakes."

As service vehicle 12 approaches spacecraft 10, boom 46 is extended relative to docking face 24b and cable 50 is extended relative to docking cone 48. Ball 70 is directed toward concave socket 22a and the interior conical surface of socket 22a serves to direct ball 70 into latching mechanism 24 even if initially misaligned. Upon entering latching mechanism 22 the ball is latchingly captured by the latching mechanism whereafter cable 50 is retracted by energization of motor 80 to firmly seat docking cone 48 within conical socket 22a whereafter boom 46 is retracted relative to docking face 24b by energization of motor 52 to bring service vehicle 12 into docking proximity with spacecraft 10. Docking cone 48 may be rotated by energization of motor 60 to correct any rotary misalignment of the spacecraft and the service vehicle.

Further details of the manner in which the active docking structure on the service vehicle coacts with the passive docking structure on the spacecraft to achieve docking of the vehicles is disclosed in U.S. Pat. No. 5,364,046.

Canister handling assembly 44 includes a carriage 82, an arm 84, and a gripper 86.

Carriage 82 includes a worm wheel 88 mounted for axial movement along boom 46 by a keyway 88a guiding on a key 46d on the boom. Worm wheel 88 is moved axially along the boom by an electric motor 90 mounted on the worm wheel and driving a pinion 92 engaging a rack 94 provided on the key 46a.

Carriage 82 further includes a circular plate 96 mounted on a hub portion 88a of worm wheel 88 for rotational movement about the central boom axis 26. A worm 98 driven by a motor 100 mounted on plate 96 engages worm wheel 88 to rotate plate 96 relative to the worm wheel.

Arm 84 is mounted on plate 96 via brackets 102 and includes a rack 84a formed along one edge of the arm engaging a pinion gear 104 driven by an electric motor 106 mounted on plate 96 whereby energization of motor 106 results in radially inner or radially outer movement of arm 84 relative to carriage 82.

Gripper 86 includes a wrist motor 108 secured to the outer end of arm 84, a finger structure 110 secured to the output shaft of motor 108 so that the finger structure is rotated about the axis of the motor output shaft upon energization of the motor, and a latch motor 112 secured to finger structure 110. Finger structure 110 includes a base portion 110a secured to the output shaft of the motor 108, a pair of spaced fingers 110b and a central opposed finger 110c. Latch motor 112 is secured to the outboard face of central opposed finger 110c and a cam 114 on the output shaft of motor 112 is operative when energized to move a latch 116 slidably mounted in finger 110c to an unlatched or disengaged position against the bias of a spring 118. Spring 118 is operative to normally maintain latch 116 in an extended or latching position. Latch 116 includes a beveled end face 116a to facilitate retraction of the latch in response to engagement of a canister lug 20 or 32.

Each canister lug 20 includes an inboard flange portion 20a attached to the associated canister, an outboard flange portion 20b and a latch portion 20c positioned between the flange portions and including a detent or notch 20d for coaction with latch 116 of finger structure 110. Latch portion 20c has a length (as measured between the inboard faces of the flange portions) corresponding to the width of portion 110a of finger structure 110 and a thickness corresponding to the distance between the inboard face of central opposed finger 110c and the inboard faces of spaced fingers 110b so that, as best seen in FIG. 10, finger structure 110 may fit over the lug 20 like a glove with the inboard face of spaced fingers 110b embracing one side face of latch portion 20c, the inboard face of the central opposed finger 110c embracing the other side face of latch portion 20c, and flange portions 20a and 20b flanking the side edge faces of base portion 110a. As the finger structure 110 moves over the latch 20 from the position seen in FIG. 9 to the position seen in FIG. 11, the rounded end face of latch portion 20c engages the beveled end face 116a of the latch 116 to move the latch to its retracted position against the bias of spring 118 so as to allow the finger portions to move over the latch portion whereupon, as the latch 116 reaches the detent 20d, spring 118 acts to extend the latch to move the tip of the latch into the detent 20d and firmly secure the finger structure to the lug and thereby to the associated canister. Release of the latch 116 from the detent 20d to allow removal of the gripper from the lug to release the associated canister is accomplished by energization of motor 112 to move cam 114 in a sense to retract latch 116 against the bias of spring 118 and allow separation of finger structure 110 and the lug.

Lugs 32 are similar to lugs 20 and include an inboard flange portion 32a, an outboard flange portion 32b, a latch portion 32c, and a detent 32d.

A park finger structure 120 is secured to the outer rim of parking face 24b of service vehicle 24 intermediate a pair of circumferentially spaced canisters 30. Park finger structure 120 is a mirror image of finger structure 110 and includes a base portion 120a, a pair of spaced fingers 120b, and a central opposed finger 120c. Base portion 120a is secured along its side edge 120e to the docking face 24b of the service vehicle and a latching socket 122 is provided on the inboard face of central opposed finger 120c for latching coaction with a spring biased plunger 124 projecting from the side face of lug latch portion 20c/32c opposite to the side face of the lug latch portion on which the detent 20d/32d is provided.

In use, spacecraft 14 is placed in orbit by any known means such as a dedicated launch or by the use of a space shuttle. Prior to the launch, each canister 18 is suitably loaded in a manner to allow the canister to perform a manufacturing operation in space as the spacecraft moves through its orbit. The manufacturing operations may include, for example, production of semiconductors and superconductors using production processes such as molecular and chemical beam epitaxy, and production of substances important to biological research such, for example, as the growth of protein crystals to determine crystalline structure for purposes of drug research.

After the spacecraft has moved through its orbit over a period of time sufficient to allow the manufacturing processes within the canisters to be completed, the service vehicle is placed in the orbit of the spacecraft either by a dedicated launch or by the use of a space shuttle. As the service vehicle approaches the spacecraft boom 46 is positioned in its extended position seen in FIGS. 1, 2 and 3 and cable 50 is positioned in its extended position as also seen in FIGS. 1, 2 and 3.

As the service vehicle reaches the spacecraft the ball 70 is guided by the conical socket 22a into the latch mechanism 22 where it is firmly and latchingly grasped whereafter motor 80 is energized to retract the cable and move the docking cone 48 into firm docking engagement with the conical socket 22a. The service vehicle is now docked to the spacecraft albeit in axially spaced relation with the axial spacing between the spacecraft and the service vehicle, as determined by the axial extension of boom 46, being somewhat greater than the axial length of a canister 18/30. The process of canister exchange; may now begin as between the original canisters on the spacecraft, which have now produced a product which must be harvested, and the replacement canisters on the service: vehicle.

However, since it is economical to have a like number of canisters on the spacecraft and on the service vehicle and to not unduly complicate either craft by the provision of an extra canister compartment, it is necessary before an exchange can begin to park one of the original canisters 18 or one of the replacement canisters 30 on the service vehicle utilizing the park finger structure 120.

For example, a replacement canister 30 may be parked on park finger structure 120 by energizing motor 90 to an extent to move carriage 82 axially rearwardly to a location in which the gripper 86 is in axial alignment with the lugs 32; energizing motor 100 to rotate plate 96 to a point where gripper 86 is radially aligned with a specific lug 32 on a specific canister 30; actuating motor 106 to extend arm 84 radially and move gripper 86 into latching engagement with the selected lug 32 (as shown in FIG. 8 and FIG. 10) with the latch 116 retracting upon engagement with the lug latching portion 32c and then extending as the latch reaches the detent 30d to firmly lock the gripper to the lug; motor 90 is energized to move the carriage 82 axially forwardly toward the spacecraft to withdraw the selected canister 30 from its compartment 24a and position the withdrawn canister between the docking faces 14b and 24b; motor 106 is energized to extend arm 84 radially outwardly to move the canister radially outwardly to a position in which it is radially beyond the spacecraft and the service vehicle; wrist motor 106 is energized to rotate finger structure 110 through 180° and thereby move the gripped canister through 180° to a position generally overlying the spacecraft; motor 90 is again energized to move the carriage 82 axially rearwardly toward the service vehicle to again position the canister between the docking faces 14b and 24b although still in a position radially beyond the spacecraft and the service vehicle; motor 106 is again energized to retract arm 84 radially and move the canister back to a position between docking faces 14b and 24b and with the gripped lug 32 positioned radially inwardly of park finger structure 120; motor 100 is energized to rotate arm 84 and gripper 86 to a position in radial alignment with park finger structure 120; motor 106 is energized to extend arm 84 radially and move the canister radially outwardly until the captured lug 32 is positioned between the spaced fingers 120d and the central opposing finger 120c of the park finger structure with the fingers on the park finger structure and the fingers on the finger structure 110 interdigitating in mutual fashion to totally embrace lug latching portion 32c and with plunger 124 coacting with socket 122 to firmly latch the lug 32 and thereby the attached canister to the park finger structure 120; latch motor 112 is energized in a sense to rotate cam 114 in a direction to withdraw latch 116 against the bias of spring 118; and motor 106 is energized in a sense to retract ark 84 and withdraw gripper 86 from engagement with lug 32. A selected canister 30 has now been "parked" on the rim of the service vehicle (as best seen in FIG. 8) to create an empty compartment on the service vehicle so that the actual canister exchange may now proceed with a canister 18 being removed from a compartment 14a and positioned in the vacated compartment 24a on the surface vehicle, a canister 30 from the service vehicle being removed from a compartment 24a and positioned in the vacated compartment 14a on the spacecraft, and the process repeated until all of the original canisters on the spacecraft have been deposited in the compartments 24a on the service vehicle and all of the replacement canisters on the service vehicle have been deposited in the compartments 14a on the spacecraft.

To remove a canister 18 from a compartment 14a and deposit it in a vacated compartment 24a on the service vehicle, carriage 82 is moved axially forwardly to a position in which gripper 82 is in axial alignment with the lugs 20; gripper 82 is rotated to position the gripper 86 in radial alignment with the lug 20 of the selected canister 18; arm 84 is extended radially to move the gripper 86 into latching engagement with the lug 20 of the selected canister; carriage 82 is moved axially rearwardly toward the service vehicle to remove the canister 18 from the compartment 14a and position it between docking faces 14b and 24b; arm 84 is extended radially to move the canister radially outwardly to a position radially beyond the spacecraft and the service vehicle; finger structure 110 is rotated to move the associated carlister through 180° and position the canister in overlying relation to service vehicle 24; carriage 82 is moved axially forwardly toward the spacecraft to position the canister between docking surfaces 14b and 24b although radially beyond the spacecraft; arm 84 is retracted to move the canister radially inwardly to a position between docking faces 14b and 24b and in radial alignment with the compartments 14a, 24a; plate 96 is rotated to bring the canister into circumferential alignment with a vacated compartment 24a; carriage 82 is moved axially rearwardly to position the canister in the vacated compartment 24a; latch motor 112 is actuated to release the latching mechanism on the finger structure from the lug; and arm 84 is retracted to disengage the finger structure from the latch.

It will be understood that this basic procedure is repeated until all of the canisters have been interchanged. The final step involves movement of the "parked" canister 30 from its parked position on park finger structure 120 into the remaining cavity 14a in the spacecraft. This is accomplished by moving the carriage 82 axially rearwardly to a position in axial alignment with the park finger structure; rotating plate 96 to circumferentially align arm 84 with the park finger structure; extending arm 84 radially to move finger structure 86 into engagement with the lug 32 of the park structure with the fingers on the finger structure 110 and on the park finger structure 120 again interdigitating to totally embrace the lug 32 and with the latch 116 snapping into engagement with the detent 32d on the lug; retracting arm 84 to separate the lug 32 and associated canister from the park finger structure with the plunger 124 retracting against the bias of the associated spring to allow the separation of the lug 32 from the park finger structure 120; continuing the retraction of arm 84 until the canister is radially aligned with the compartments 14a; rotating plate 96 to bring the canister into circumferential alignment with the last remaining vacant compartment 14a on the spacecraft; moving carriage 82 axially forwardly to position the canister in the last remaining vacant cavity 14a; energizing latch motor 112 to disengage the latch 116; and retracting arm 84 to disengage the gripper 86 from the lug. The canister exchange process is now complete.

The spacecraft and service vehicle are now moved to a closely coupled docking position to facilitate the supply of manufacturing process consumables and replenishing fluids to the spacecraft via the probes 34 and the receptacles 14c. Specifically, carrier 82 is moved axially forwardly on the boom 46 to a position proximate the docking cone 48 and motor 52 is energized in a sense to retract boom 46 toward the docking face 24b to the point where the rear face of arm 84 is positioned proximate the docking face 24b of the service vehicle.

As noted, in the closely docked position, the service vehicle may resupply the spacecraft with manufacturing process consumables and may replenish fluids and other resources on the spacecraft. An electrical connection may also be established between the vehicles at this time is illustrated schematically by spacecraft socket 14d and coacting service vehicle plug 24c. Following a replenishment and resupply of the spacecraft from the service vehicle with the vehicles in a closely docked configuration, ball 70 may be released by docking latching mechanism 22b (in the manner described in more detail in copending U.S. patent application Ser. No. 839,996) to allow the service vehicle to separate from the spacecraft for return to earth.

Return to earth may be accomplished in any of various ways and may for example involve return to a space shuttle for subsequent return to earth or may involve direct return to earth, all in known manner. Once returned to earth, the canisters 18 removed from the spacecraft may be removed from the service vehicle and the product of the canisters may be harvested for use by terrestrial consumers, whereafter, after a lapse of a predetermined period of time measured to allow the desired product to be generated and housed in the replacement canisters now in the spacecraft, the service vehicle may again be returned to the orbit of the orbiting spacecraft so as to again perform a canister exchange with the orbiting spacecraft and replenish the supplies of the orbiting spacecraft.

The invention will be seen to provide a method and apparatus for manufacturing products in space on an ongoing and economically viable basis with the spacecraft remaining in orbit for an indefinite period of time and continuing over an indefinite period of time to manufacture a product within the canisters for subsequent return to earth via the service vehicle for harvest and use by terrestrial consumers.

Whereas a preferred embodiment of the invention has been illustrated and described in detail it will be apparent that various changes may be made in the disclosed embodiment without departing from the spirit or scope of the invention.

We claim:

1. A method of manufacturing in space, comprising:
    positioning an original manufacturing canister on a spacecraft vehicle;
    placing the spacecraft vehicle in orbit;
    performing a manufacturing process on the spacecraft vehicle while the spacecraft vehicle moves in its orbit to produce a manufactured product within the canister;
    positioning a replacement manufacturing canister, having a size and configuration corresponding generally to the size and configuration of the original canister, on a service vehicle;
    placing the service vehicle in said orbit;
    docking the spacecraft vehicle and service vehicle in a first docking position in which the spacecraft vehicle and service vehicle are spaced apart;
    with the spacecraft vehicle and service vehicle in the first spaced docking position, transferring the original canister from the spacecraft vehicle to the service vehicle and positioning the replacement canister on the orbiting spacecraft vehicle in the position vacated by the original canister;

docking the spacecraft vehicle and the service vehicle in a second docking position in which the spacecraft vehicle and service vehicle are closely coupled;

with the spacecraft vehicle and service vehicle in the second closely coupled docking position, transferring manufacturing process consumables from the service vehicle to the spacecraft vehicle;

undocking the service vehicle and the spacecraft vehicle; and returning the service vehicle to Earth to harvest the product.

2. The method according to claim 1, wherein the service vehicle includes a manipulator assembly including a central docking boom and a canister handling assembly mounted for axial movement along the boom, the method further comprising:

docking the boom with the spacecraft vehicle with the boom in an extended position to establish the first spaced docking position, actuating the canister handling assembly to transfer to the service vehicle, and retracting the boom to move the spacecraft vehicle and service vehicle to the second closely coupled docking position for the transfer of manufacturing process consumables.

3. A method of manufacturing in space, comprising:

placing a spacecraft vehicle in orbit, the spacecraft vehicle having a plurality of compartments respectively housing a plurality of original canisters;

performing a manufacturing process on the spacecraft vehicle while the spacecraft vehicle moves in its orbit to produce a manufactured product within one or more of said canisters;

placing a service vehicle in said orbit, the service vehicle having a plurality of compartments respectively housing a plurality of replacement canisters, each replacement canister having a size and configuration corresponding generally to the size and configuration of each original canister, each of the canister compartments in the spacecraft vehicle opening in a docking face of the spacecraft vehicle and each of the canister compartments on the service vehicle opening in a docking face of the service vehicle;

docking the service vehicle and spacecraft vehicle so that the docking faces are confronting but axially spaced apart by a distance at least as great as the length of a canister;

transferring an original canister from the orbiting spacecraft vehicle to the service vehicle and positioning a replacement canister on the orbiting spacecraft vehicle in the position vacated by the original canister using the following steps:

moving a replacement canister axially forwardly was inserted after "forwardly" out of a service vehicle compartment until it reaches a position between the confronting docking faces;

moving the replacement canister radially outwardly to a position radially beyond the spacecraft and the service vehicles;

rotating the replacement canister through 180°;

moving the replacement canister axially rearwardly toward the service vehicle to again position it axially between the confronting faces but radially outwardly of the spacecraft and service vehicles;

moving the replacement canister radially inwardly to position it axially between the confronting docking faces and in radial alignment with the compartments; and moving the replacement canister axially forwardly was inserted after "forwardly" to position it in a vacated compartment on the spacecraft vehicle;

undocking the service vehicle and the spacecraft vehicle; and returning the service vehicle to Earth to harvest the product.

4. The method according to claim 3, wherein the spacecraft and service vehicles are docked with their respective central axes generally aligned, and the service vehicle and spacecraft vehicle compartments are each arranged in circumferentially spaced relation about the respective central axis of the spacecraft vehicle and service vehicle; and, following the movement of the replacement canister radially inwardly to position it axially between the confronting docking faces and in radial alignment with the compartments, rotating the replacement canister about the aligned central axes of the spacecraft and service vehicles as necessary to reach a circumferential position opposite a vacated spacecraft vehicle compartment.

* * * * *

UNITED STATES PATENT AND TRADEMARK OFFICE
CERTIFICATE OF CORRECTION

PATENT NO. : 5,429,328
DATED : July 4, 1995
INVENTOR(S) : Dobbs et al.

It is certified that error appears in the above-indentified patent and that said Letters Patent is hereby corrected as shown below:

Column 3, line 39: Replace "witch" with --with--.

Column 7, line 31: Replace "shuttie" with --shuttle--.

Column 9, line 16: Replace "carlister" with --canister--.

Column 9, line 54: Replace "vacant:" with --vacant--.

Column 12, lines 8-9: Delete "was inserted after forwardly".

Column 12, line 25: Delete "was inserted after forwardly".

Column 12, line 8, after "forwardly", insert --toward the spacecraft vehicle--.

Column 12, line 24, after "forwardly", insert --toward the spacecraft vehicle--.

Signed and Sealed this

Twenty-first Day of November, 1995

Attest:

BRUCE LEHMAN

Attesting Officer

Commissioner of Patents and Trademarks